United States Patent [19]

Ota et al.

[11] Patent Number: 4,680,745

[45] Date of Patent: Jul. 14, 1987

[54] OPTICAL DISK RECORDING APPARATUS

[75] Inventors: Minemasa Ota; Osamu Matsumoto; Hiroyuki Ohira, all of Saitama, Japan

[73] Assignee: Pioneer Electronic Corporation, Tokyo, Japan

[21] Appl. No.: 701,267

[22] Filed: Feb. 13, 1985

[30] Foreign Application Priority Data

Feb. 13, 1984 [JP] Japan ............................. 59-17480[U]

[51] Int. Cl.⁴ ........................ G11B 7/09; G11B 7/125
[52] U.S. Cl. .................................... 369/45; 250/201; 346/76 L; 369/110; 369/111; 369/116
[58] Field of Search ...................... 250/201; 346/76 L; 369/275, 277, 284, 110, 111, 109, 116, 106, 45, 54, 278, 279

[56] References Cited

U.S. PATENT DOCUMENTS

| | | | |
|---|---|---|---|
| 3,902,010 | 8/1975 | Goshina | 369/279 |
| 3,969,575 | 7/1976 | Gerritsen | 369/45 |
| 4,027,330 | 5/1977 | Maslowski | 369/279 |
| 4,142,210 | 2/1979 | Otobe | 369/109 |
| 4,566,088 | 1/1986 | Yoshida | 369/275 |

FOREIGN PATENT DOCUMENTS 108258  5/1984  European Pat. Off. ............ 369/275

Primary Examiner—Alan Faber
Attorney, Agent, or Firm—Sughrue, Mion, Zinn Macpeak & Seas

[57] ABSTRACT

An apparatus for recording pits and grooves on the surface of a recording medium such as an optical disk in which the pits and grooves are formed by separate light sources, thereby providing accurate control over the dimensions of both the pits and grooves. Light beams of separate wavelengths suitable for forming the pits and grooves are passed through respective optical modulators and continuously variable beam expanders, and then combined and applied through a focusing lens to the recording medium. A beam monitor and a focus monitor receive part of the light reflected from the surface of the disk to control the focus and beam size conditions.

5 Claims, 8 Drawing Figures

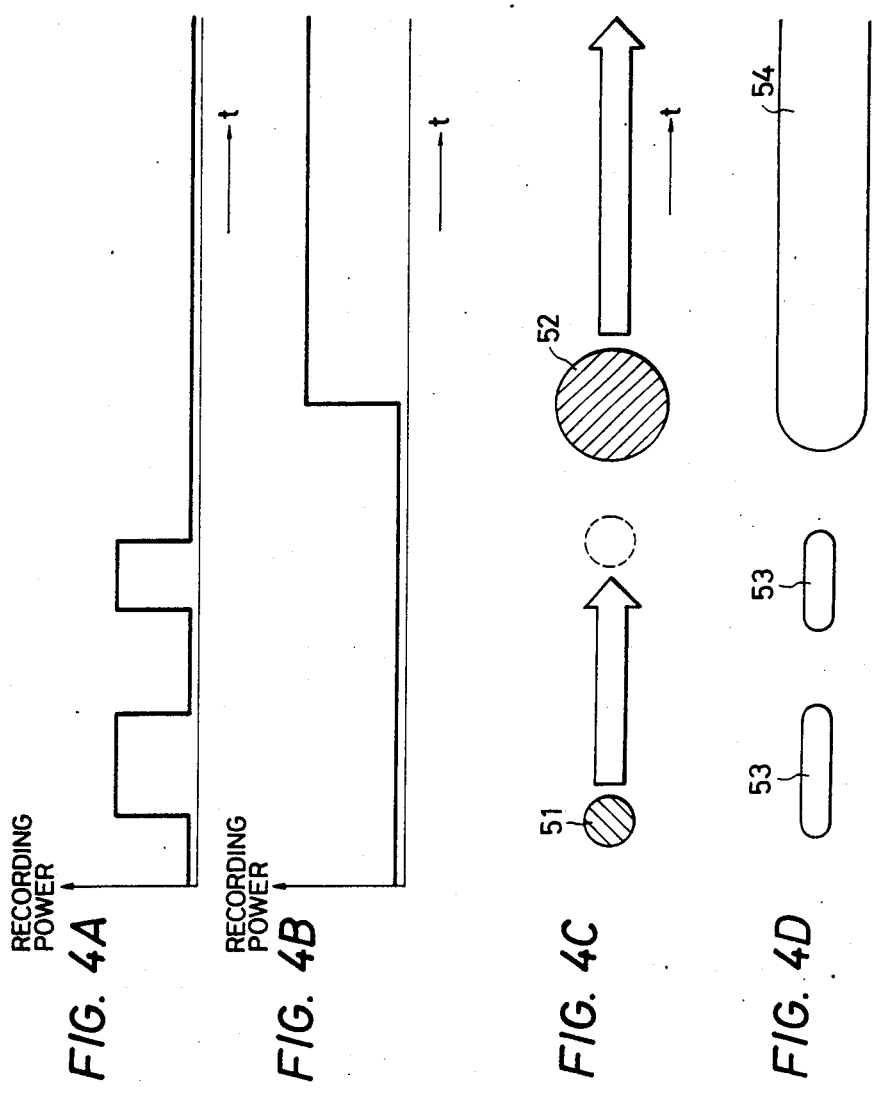

OPTICAL DISK RECORDING APPARATUS

BACKGROUND OF THE INVENTION

The present invention relates a recording apparatus in which a light beam is applied to a recording medium to form pits or grooves therein.

A conventional recording apparatus of this type is constructed as shown in FIG. 1. In this apparatus, a light beam 1 is modulated by an optical modulator 2 and its diameter is increased to a desired value by a beam expander 3. The light beam thus treated is applied through a beam splitter 4 to a mirror 5. The light beam reflected from the mirror 5 is focused on a recording medium 7 by a focusing lens 6. The light beam reflected from the recording medium 7 is returned through the lens 6, the mirror 5 and the beam splitter 4 to a focus servo system 8. The focus servo system 8 detects the light beam 9 thus returned to control the position of the lens 6 with respect to the recording medium 7 so that the focusing condition of the lens 6 is maintained accurate and stable.

In recording pits with the above-described conventional recording apparatus, the pits can be changed in configuration (length, width and depth) by controlling the irradiation time and the recording power of the light beam 1 with the optical modulator 2. In recording grooves with the apparatus, the grooves can be changed in configuration (width and depth) by controlling the recording power of the light beam 1. For instance, in the recording operation using a light beam 1 modulated as shown in FIG. 2A, pits 11 and a groove 12 are, in general, obtained as shown in FIG. 2B.

However, in the above-described conventional recording apparatus, the same recording beam and the same focused spot size are used to record both the pits 11 and the groove 12. Therefore, in this apparatus, the only way to change the pit or groove configuration is to control the recording power. Thus, the recording performance of the conventional apparatus is limited to some degree. Furthermore, the conventional recording apparatus is disadvantageous in that only a single wavelength light beam is used for recording.

SUMMARY OF THE INVENTION

Overcoming the above and other objects, the invention provides a recording apparatus in which individual light beams and focused spot sizes are used to record pits and grooves.

BRIEF DESCRIPTION OF THE DRAWINGS

FIGS. 4A, 4B, 4C and 4D are schematic diagrams for a description of the recording operation of the recording apparatus according to the invention.

DESCRIPTION OF THE PREFERRED EMBODIMENTS

Figure 1:
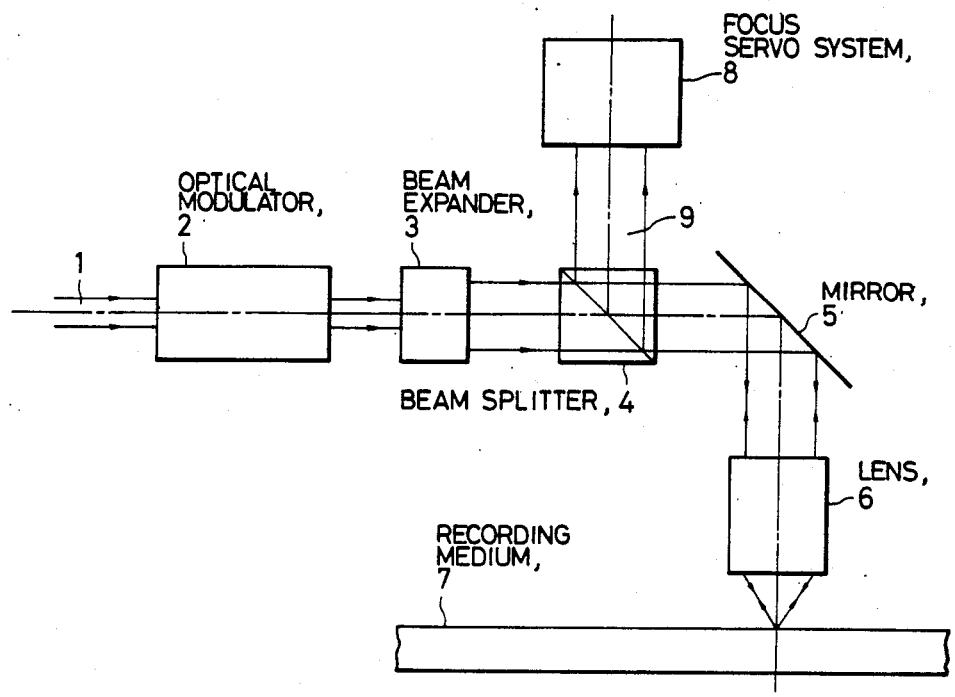
FIG. 1 is a block diagram showing a conventional recording apparatus.
Figure 2A:
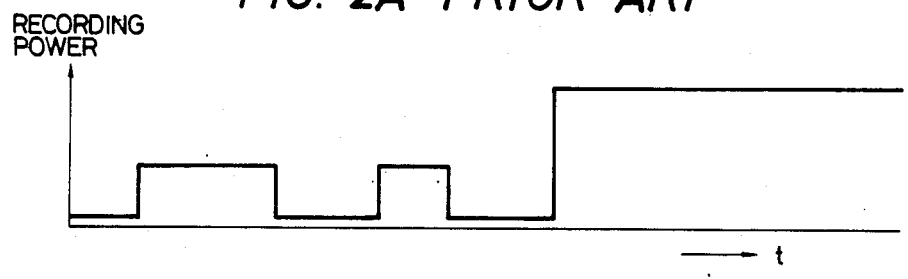
FIGS. 2A and 2B are schematic diagrams for a description Cof the recording operation of the recording apparatus in FIG. 1.
Figure 2B:
Figure 3:
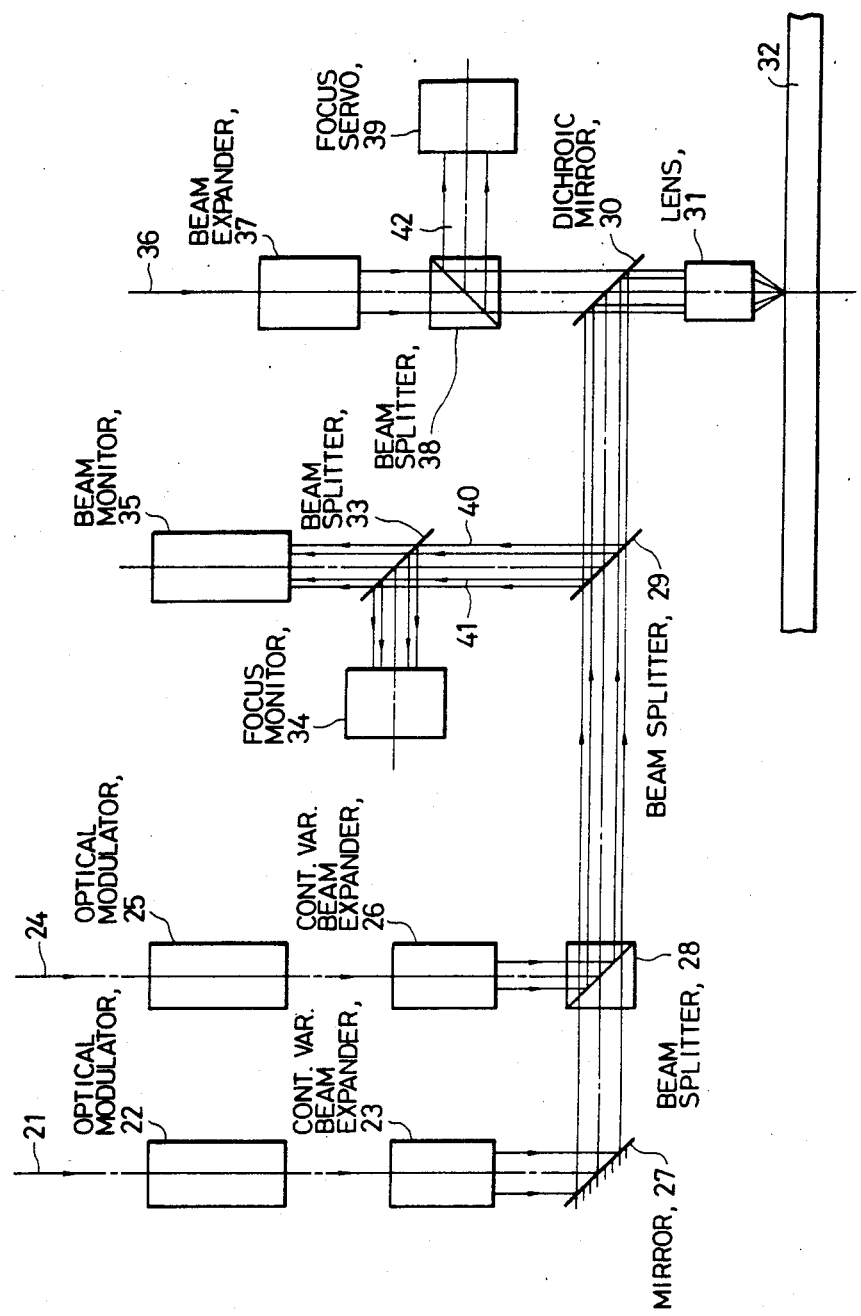
FIG. 3 is a block diagram showing an example of a recording apparatus according to the invention.

FIG. 3 is a block diagram showing an example of a recording apparatus according to the invention.

In the apparatus, a first light beam 21 is applied to an optical modulator 22 where it is modulated. The light beam thus modulated is applied to a continuously variable beam expander 23 in which its diameter is increased to a desired value. The light beam thus treated is reflected by a mirror 27 and applied through a beam splitter 28 and a beam splitter 29 to a dichroic mirror 30 by which it is reflected towards a focusing lens 31.

Similarly, a second light beam 24 is applied to an optical modulator 25 where it is modulated. The light beam thus modulated is applied to a continuously variable beam expander 26 where its diameter is increased to a desired value. The light beam thus treated is reflected by the beam splitter 28 and is passed through the beam splitter 29 to the dichroic mirror 30 with which it is reflected towards the focusing lens 31. The light beam 21 and the light beam 24 applied to the focusing lens 31 are focused on a recording medium 32, forming spots different in size.

The first light beam reflected from the recording medium 32, namely, a return light beam 40, and the second light beam reflected from the recording medium 32, namely, a return light beam 41, are applied through the dichroic mirror 30 and the beam splitter 29 to a beam splitter 33 where each of the return light beams 40 and 41 is split into two parts, which are applied respectively to a focus monitor 34 and a beam monitor 35. The focus monitor 34 senses whether or not the light beam 21 and the light beam 24 are suitably focused on the recording medium 32. The beam monitor 35 senses the sizes of the spots of the light beams 21 and 24 on the recording medium 32 and monitors whether or not the spot positions are accurately coincided with each other.

A focusing light beam 36, which does not affect the recording medium 32 at all, is applied to a beam expander 37 where its diameter is increased to a desired value. The focusing light beam 36 thus treated is applied through a beam splitter 38, the dichroic mirror 30, and the focusing lens 31 to the recording medium 32. The focusing light beam 36 reflected from the recording medium 32, namely, a return light beam 41, is applied through the dichroic mirror 30 to the beam splitter 38 where it is reflected towards a focus servo system 39. The focus servo system 39 detects the return light beam 42 and in response controls the position of the focusing lens 31, thereby to maintain the distance between the lens 31 and the recording medium 32 correctly and stably with respect to the light beam 21 and the light beam 24.

The operation of the recording apparatus thus constructed will be described with reference to the case where the first light beam is used for recording pits and the second light beam is used for recording grooves.

A light beam having a wavelength suitable for forming pits in the recording medium 32 is selected as the light beam 21 according to the wavelength characteristic of the recording medium. Similarly, the light beam 24 is one whose wavelength is suitable for forming grooves in the recording medium.

On the other hand, according to the configuration (width and depth) of pits to be formed, the size of the spot obtained be focusing the light beam 21 and the recording power thereof are set to suitable values by the continuously variable beam expander 23. Similarly, according to the configuration (width and depth) of a groove to be formed, the sized of the spot obtained by focusing the light beam 24 and the recording power thereof are set to suitable values by the continously variable beam expander 26.

FIGS. 4A and 4B schematically show on a time axis the light beam 21 and the light beam 24 which have been treated by the continously variable beam expander 23 and the continuously variable beam expander 26, respectively.

The light beam 21 shown in the FIG. 4A is reflected by the mirror 27 and applied through the beam splitter 28, the beam splitter 29, and the dichroic mirror 30 to the focusing lens 31 so that it is focused into a recording light spot 51, as shown in the FIG. 4C. The light beam 24 shown in the FIG. 4B is reflected by the beam splitter 28 and applied through the beam splitter 29 and the dichroic mirror 30 to the focusing lens 31 so that it is focused into a recording light spot 52 as shown in FIG. 4C. The recording light spots 51 and 52 are applied to the recording medium 32. As the recording medium 32 is moved, pits 53 and groove 54 are formed on one line (track) as shown in FIG. 4D.

The configurations (width and depth) of the pits 53 and the groove 54 can be changed by controlling the wavelengths and the recording powers of the light beam 21 and the light beam 24 and the size of the light spots 51 and 52.

In the above-described embodiment of the invention, the diameters of the light spots 51 and 52 are controlled in recording pits and grooves. However, the configurations of the light spots also may be controlled by beam pattern shaping units arranged at suitable points on the optical path with the same effect as that of the above-described embodiment.

As is apparent from the above description, in the recording apparatus of the invention, two individual light beams are used to form pits and grooves in the recording medium, and the wavelengths and the recording powers of the light beams and the sizes of the spot lights can be selected as desired. Therefore, with the recording apparatus of the invention, the recording performance is improved, the pit and groove configuration control range is increased, and the pit and groove configurations can be readily controlled.

The inventive recording apparatus, because it uses two light beams of different wavelengths, can record pits and grooves by the utilization of the wavelength sensitivity of the recording medium.

What is claimed is:

1. A recording apparatus in which light is applied to a recording medium to form pits and grooves therein, comprising:

first varying means to form pits receiving a first light beam for varying the size of light spot formed on said recording medium by said first light beam and the recording power thereof; and second varying means to form grooves receiving a second light beam of a different wavelength from that of said first light beam for varying the size of said second light beam and for varying the size of a light spot formed on said recording medium by said second light beam and the recording power thereof.

2. The recording apparatus of claim 1, wherein said first and second varying means each comprises an optical modulator and a continuously variable beam expander.

3. The recording apparatus of claim 2, further comprising a common mirror and a common beam splitter disposed to combined beam outputs beam of said continuously variable beam expanders.

4. A recording apparatus in which light beam is applied to a recording medium to form pits and grooves therein, comprising: a first optical modulator for recording pits receiving a first light beam of a wavelength; a continuously variable first beam expander receiving the output of said first optical modulator; a second optical modulator for forming grooves on said recording medium receiving a beam of light of a different wavelength; a continuously variable second beam expander receiving the output of said second optical modulator; a mirror and a first beam splitter disposed so as to combine outputs from said first and second continuously variable beam expanders; a third beam expander receiving a focusing beam of light; a second beam splitter disposed in a path of the output of said third beam expander; a dichroic mirror receiving on a first surface the output of said first beam splitter and on a second surface the output of said second beam splitter; a lens for focusing light received from said dichroic mirror on a surface of said recording medium and returning reflected light to said recording medium and returning reflected light to said first surface of said dichroic mirror; and a focus servo system receiving reflected light from said second beam splitter for controlling said focusing lens.

5. The recording apparatus of claim 4, further comprising a third beam splitter disposed between said first beam splitter and said first surface of said dichroic mirror; a beam monitor and a focus monitor; and a fourth beam splitter for dividing light received from said third beam splitter between said beam monitor and said focus monitor.

* * * * *